US010516656B2

(12) United States Patent
Mahorka

(10) Patent No.: US 10,516,656 B2
(45) Date of Patent: Dec. 24, 2019

(54) DEVICE, METHOD, AND COMPUTER PROGRAM PRODUCT FOR SECURE DATA COMMUNICATION

(71) Applicant: Diethard Mahorka, Melk (AT)

(72) Inventor: Diethard Mahorka, Melk (AT)

(*) Notice: Subject to any disclaimer, the term of this patent is extended or adjusted under 35 U.S.C. 154(b) by 141 days.

(21) Appl. No.: 15/738,238

(22) PCT Filed: Jun. 21, 2016

(86) PCT No.: PCT/AT2016/050214
§ 371 (c)(1),
(2) Date: Dec. 20, 2017

(87) PCT Pub. No.: WO2016/205845
PCT Pub. Date: Dec. 29, 2016

(65) Prior Publication Data
US 2018/0176201 A1  Jun. 21, 2018

(30) Foreign Application Priority Data
Jun. 23, 2015 (AT) .................................. 50524/2015

(51) Int. Cl.
*H04L 29/06* (2006.01)
*G06F 21/60* (2013.01)
(Continued)

(52) U.S. Cl.
CPC .......... *H04L 63/062* (2013.01); *G06F 9/4881* (2013.01); *G06F 21/602* (2013.01);
(Continued)

(58) Field of Classification Search
CPC .............................. H04L 63/062; G06F 21/602
See application file for complete search history.

(56) References Cited

U.S. PATENT DOCUMENTS 4,642,756 A * 2/1987 Sherrod ................ G06F 9/4881
712/244
2005/0122975 A1  6/2005 Lim
(Continued)

FOREIGN PATENT DOCUMENTS

CN 1992714 A 7/2007
EP 1657878 A1 5/2006

OTHER PUBLICATIONS

Khalifa, et al., "A Survey of Communication Protocols for Automatic Meter Reading Applications," IEEE Communications Surveys & Tutorials, vol. 13, No. 2, Second Quarter 2011, pp. 168-182.
(Continued)

*Primary Examiner* — Ponnoreay Pich
(74) *Attorney, Agent, or Firm* — Hoffman and Baron, LLP

(57) ABSTRACT

The invention relates to devices, methods, and computer program products for secure data communication according to a network protocol having a plurality of communication layers layered into a protocol stack. Said device comprises a processor system, in which a processor, controlled by a task scheduler, executes a plurality of autonomous software modules, which each run a communication layer of the protocol stack. The software modules are linked via communication channels to the protocol stack and the protocol stack is connected to an interface framework for data communication with an external network. At least one software module uses an assigned cryptographic key for secure data communication in its communication layer. The task scheduler is configured to obtain said key from the external network via the interface framework and to distribute said key to the assigned software module.

15 Claims, 3 Drawing Sheets

(51) Int. Cl.
*G06F 9/48* (2006.01)
*H04L 9/08* (2006.01)
*H04L 29/08* (2006.01)
*H04W 4/70* (2018.01)

(52) U.S. Cl.
CPC ............ *H04L 9/0825* (2013.01); *H04L 69/32* (2013.01); *G06F 2213/0038* (2013.01); *H04L 9/0836* (2013.01); *H04L 29/08* (2013.01); *H04L 69/30* (2013.01); *H04W 4/70* (2018.02)

(56) References Cited

U.S. PATENT DOCUMENTS

| | | |
|---|---|---|
| 2005/0141715 A1 | 6/2005 | Sydir et al. |
| 2006/0101524 A1 | 5/2006 | Weber |
| 2010/0131750 A1 | 5/2010 | Pruss et al. |
| 2013/0055275 A1* | 2/2013 | Comeau ................ G06F 9/4881 718/103 |
| 2015/0268993 A1* | 9/2015 | Montesinos Ortego ..................... G06F 9/4881 718/106 |

OTHER PUBLICATIONS

Bandyopadhyay, et al., "Role of Middleware for Internet of Things: A Study," International Journal of Computer Science & Engineering Survey (IJCSES) vol. 2, No. 3, Aug. 2011, pp. 94-105.

Kocher, et al., "Security as a New Dimension in Embedded System Design," DAC 2004, Jun. 7-11, 2004, San Diego, California, USA, 9 pages.

English Translation for International Preliminary Report on Patentability (IPRP) for PCT/AT2016/050214 dated Dec. 26, 2017.

Office Action in priority Austrian Patent Application No. A 50524/2015 dated Mar. 18, 2016 with English translation.

* cited by examiner

DEVICE, METHOD, AND COMPUTER PROGRAM PRODUCT FOR SECURE DATA COMMUNICATION

CROSS-REFERENCE TO RELATED APPLICATIONS

This application is a National Phase application of International Application No. PCT/AT2016/050214 filed Jun. 21, 2016 which claims priority to Austrian Patent Application No. A 50524/2015 filed Jun. 23, 2015, the disclosures of which are incorporated herein by reference.

BACKGROUND

The present invention relates to devices, methods, and computer program products for secure data communication according to a network protocol having a plurality of communication layers layered into a protocol stack.

One of the most well-known and oldest layer architectures for network protocols is the OSI (Open Systems Interconnection) reference model of the ITU (International Telecommunication Union) or ISO (International Organisation for Standardization) having the following seven layers: bit transfer layer (layer 1), security layer (layer 2), network layer (layer 3), transport layer (layer 4), session layer (layer 5), presentation layer (layer 6), and application layer (layer 7). The TCP/IP (Transmission Control Protocol/Internet Protocol) reference model, on which most of the modern Internet protocols are based, is also a layered network protocol. In the case of the TCP/IP reference model, only four layers are used by combining the bit transfer layer and security layer to form a network access layer and by combining the session layer, presentation layer, and application layer to form an application layer. Layered network protocols, however, are also used in electronic control units (ECUs) which are intended to communicate securely with one another via bus systems, for example in accordance with IEC standard 61508 or in the vehicle sector in accordance with the ISO standard 26262, derived from the aforementioned IEC standard, in a wide range of ASIL levels (Automotive Safety Integrity Levels), or in communication devices for the networking of vehicles, keyword "car-to-car" (Car2Car) or "car-to-infrastructure" (Car2X).

In order to implement such layered network protocols in terminal devices, the individual layers are often encapsulated in autonomous software modules or tasks, which are connected to one another via precisely defined interfaces or communication channels. The "vertical" stacking so to speak or arrangement one above the other of the software modules replicating the individual protocol layers is also referred to here as a "protocol stack".

Protocol stacks have to meet a very wide range of demands, which at times are conflicting. On the one hand, they should satisfy increasingly greater security requirements, which is implemented by increasingly more complex cryptographic encryption methods at the level of the individual protocol layers. The software modules in the protocol stack for this purpose also each require a corresponding cryptographic key for encryption and decryption of the data traffic at the level of their layer. On the other hand, protocol stacks should run on processor systems in the most sparing and economical manner possible. These are usually embedded single-chip processor systems, for example for end-user modems (Residential Gateways) or Internet-enabled terminal devices (keyword: "Internet of Things"), in which the protocol stack functions as what is known as middleware. At the same time, the porting effort of the protocol stack from one specific processor or operating system to another should also be as low as possible, which requires a corresponding encapsulation of the software modules via hardware or software abstraction layers.

The significance of protocol stacks as middleware precisely in the heterogeneous environment of the "Internet of Things" is described in Bandyopadhyay S. et al., "Role of Middleware for Internet of Things: A Study", International Journal of Computer Science & Engineering Survey (IJCSES), vol. 2, no. 3, August 2011. A good overview of the security requirements in such environments is given by Kocher, P., et. al., in "Security as a New Dimension in Embedded System Design", DAC 2004, 7-11 Jun. 2004, San Diego, Calif., USA.

SUMMARY

The object of the invention is to create devices and methods of the type mentioned in the introduction, which better reconcile the aforementioned conflicting requirements compared to the known solutions.

This objective is achieved in a first aspect of the invention with a device for secure data communication according to a network protocol having a plurality of communication layers layered into a protocol stack, which device has a processor system, in which a processor, controlled by a task scheduler, executes a number of autonomous software modules, which each run a communication layer protocol stack, wherein the software modules are linked via communication channels to the protocol stack and the protocol stack is connected to an interface framework for data communication with an external network, and wherein at least one software module uses an assigned cryptographic key for secure data communication in its communication layer, which device is characterised in that the task scheduler is designed to distribute a key, obtained from the external network via the interface framework, to the assigned software module.

In a second aspect the invention for this purpose provides a method for secure data communication according to a network protocol having a plurality of communication layers layered into a protocol stack, wherein, in a processor system, a processor, controlled by a task scheduler, executes a number of autonomous software modules, which each run a communication layer of the protocol stack, wherein the software modules are linked via communication channels to the protocol stack and the protocol stack is connected to an interface framework for data communication with an external network, and wherein at least one software module uses an assigned cryptographic key for secure data communication in its communication layer, which method is characterised in that the at least one key is obtained from the external network via the interface framework and is distributed by the task scheduler to the assigned software module.

In accordance with the invention the task scheduler, which is responsible in a single-processor system, for example in a residential gateway, a security gateway or a control electronics unit, for the task-switching between autonomous software modules replicating the individual protocol layers, is thus used for the distribution of cryptographic security keys, which for example come from a communication partner or a central key generation entity in the network, to the respective software modules. This allows a particularly simple implementation of any security measures at the level of the various protocol layers, without impairing the encapsulation and abstraction of the individual software modules relative to the hardware, the operating system, periphery drivers or the like, and without the need for particular resources for the key distribution: the task scheduler already provided is easily also used simultaneously for this purpose.

The solution according to the invention is suitable for any type of network protocol, for example according to the TCP/IP reference model in the case of an Internet modem or layered protocols for satisfying safety-critical requirements corresponding to the Automotive Integrity Safety Levels (ASIL) defined in ISO 26262 in the case of electrical vehicle components. In accordance with another embodiment of the invention, the network protocol is constructed according to the OSI reference model and each software module runs a layer of the OSI reference model, for example for an ISDN modem or an ISDN/IP interface adapter, also referred to as "ALL-IP modem".

The software modules can each have an input for at least one message channel, which is connected to the task scheduler, so as to thus obtain the corresponding key.

The (at least one) message channel of the software module can also be used to set the software module into a debugging mode and to debug it, for example by means of debugging messages, which are exchanged via the message channel, and/or in particular to switch it on and off for debugging purposes of this type.

A further key obtained from the task scheduler can also be used in particular to encrypt or decrypt the message traffic on the message channel so as to ensure secure communication here as well. By way of example, this further key can be used by the software module for an encrypted transfer of the key that it used in its protocol layer.

In an advantageous embodiment of the invention the task scheduler can also be part of a hardware abstraction module for the software modules that is run by the processor and that provides a hardware-abstracted operating system environment for each of the software modules and for this purpose already has at least one message channel thereto.

The invention is suitable in principle for all types of data communication terminal devices, whether these are also merely communication interfaces in control devices, for example ECUs, which communicate with one another securely via databuses. The device is preferably a modem or an ECU, and the processor system is a single-processor system, in which the protocol stack functions as "Embedded Security Middleware". Alternatively, this "Embedded Security Middleware" can also be embedded in a multi-processor system.

In a third aspect the invention also creates a computer program product, embodied on a machine-readable data carrier, which is designed to implement the method presented here.

BRIEF DESCRIPTION OF THE DRAWINGS

The invention will be explained in greater detail hereinafter on the basis of an exemplary embodiment illustrated in the accompanying drawings. In the drawings.

DETAILED DESCRIPTION

Figure 1:
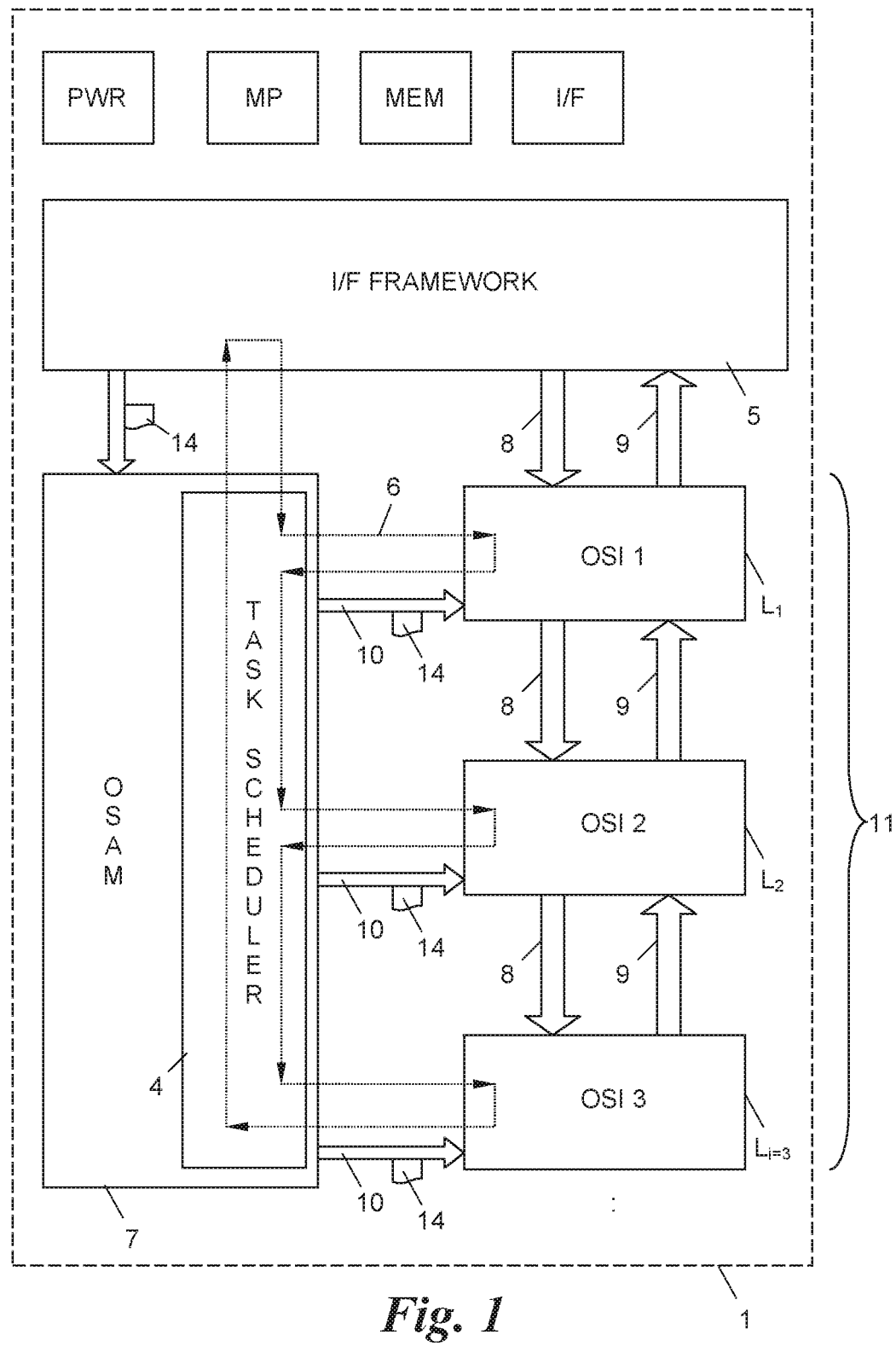
FIG. 1 shows the system architecture of the device of the invention in a block diagram.
Figure 3:
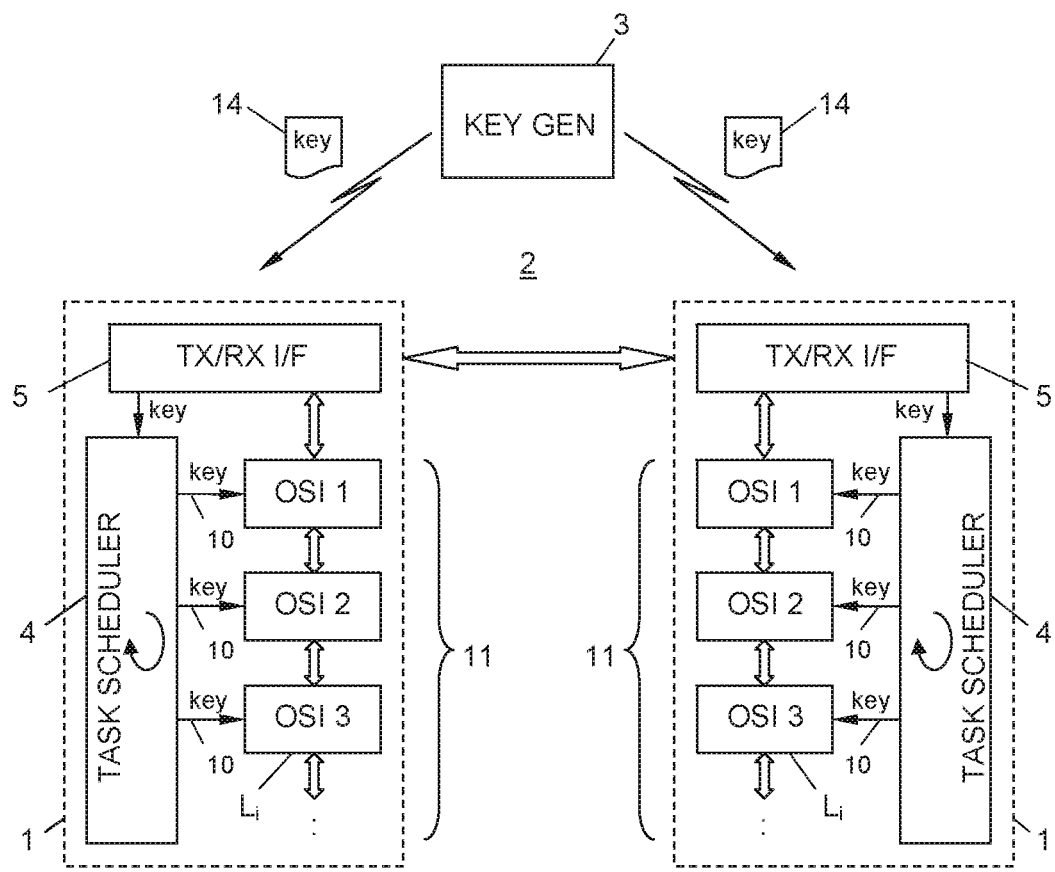
FIG. 3 shows a data flow diagram of the method of the invention at the time of the data communication of two devices according to FIG. 1 via a network.

FIG. 1 shows a device 1 for data communication according to a layered network protocol, for example the OSI or TCP/IP reference model. FIG. 3 shows two devices 1 of this type, which communicate with one another via a network 2 and (optionally) with a central key generation entity 3, as will be explained later in greater detail. The network 2 can be, for example, the Internet, a WAN (Wide Area Network), LAN (Local Area Network), a mobile radio network and/or a wired telephone network, and the device 1 can form therein a network switch or router, a modem, a gateway or a terminal device. In the case of a telephone network, the network protocol is generally constructed in accordance with the OSI reference model, and the device 1 is for example an ISDN or ALL-IP terminal device; in the case of the Internet, a WAN or LAN, the network protocol is generally constructed in accordance with the TCP/IP reference model, and the device 1 is, for example, an ADSL or Powerline modem. The network 2, however, can also be a device-internal bus system, via which electronic components communicate with one another securely via a layered network protocol ("bus protocol"), for example electronic vehicle components on an on-board vehicle bus system. The device 1 can in this case be, for example, an electronic control unit (ECU), which communicates with other electronic components via the on-board bus system of the vehicle.

The device 1 shown in FIG. 1 is generally implemented in software technology on a hardware processor system, which for this purpose—as is known in the art—comprises power supplies PWR, memories MEM, interfaces I/F and at least one processor MP, which executes corresponding software components. The components of the device 1 illustrated in FIG. 1 are therefore software components which are present at runtime of the software in the memory MEM of the device 1 and are executed accordingly by the processor MP, as is known in the art.

The processor system on which the device 1 is implemented is generally an inexpensive single-chip processor system having just one main processor MP, which executes the (software) components of the device 1 shown in FIG. 1 sequentially in the form of tasks. A task scheduler 4 is provided for this purpose, which gives the program control of the processor MP periodically and sequentially to individual software modules $L_1, L_2, \ldots$, generally $L_i$, and an interface framework module 5, see the program sequence control loop 6. The task scheduler 4 is for its part a software component and can be part of a hardware abstraction module and/or operating system or software abstraction module (Operating System Abstraction Module, OSAM) 7 which is run by the processor MP and which is also regularly operated or executed by the processor MP in the course of the loop 6.

The abstraction module 7 provides an operating system environment so to speak for the software modules $L_i$, for example for providing timers, for the management of dynamic memory requests, etc. and also for establishing communication channels 8, 9, via which the software modules are connected to one another or to the interface framework module 5, and for message channels 10, via which the software modules can receive control messages from the abstraction module 7 or task scheduler 4 thereof.

The processor MP of the device 1 can also be part of a multi-processor system, which forms a grouping of individual devices 1. Here, a plurality of devices 1 can share a processor MP, or one device 1 can have a number of processors MP. In a multi-processor system of this type, the data exchange between the devices 1 can be realised in particular also via the communication channels 8, 9 of one or more of the software modules $L_i$.

Each software module $L_i$ can have an input for more than one message channel 10. The message channel(s) 10 of a software module $L_i$ can additionally also be used to debug the corresponding software module $L_i$ or to switch it on and off for this purpose—locally or by another, connected network.

Figure 2:
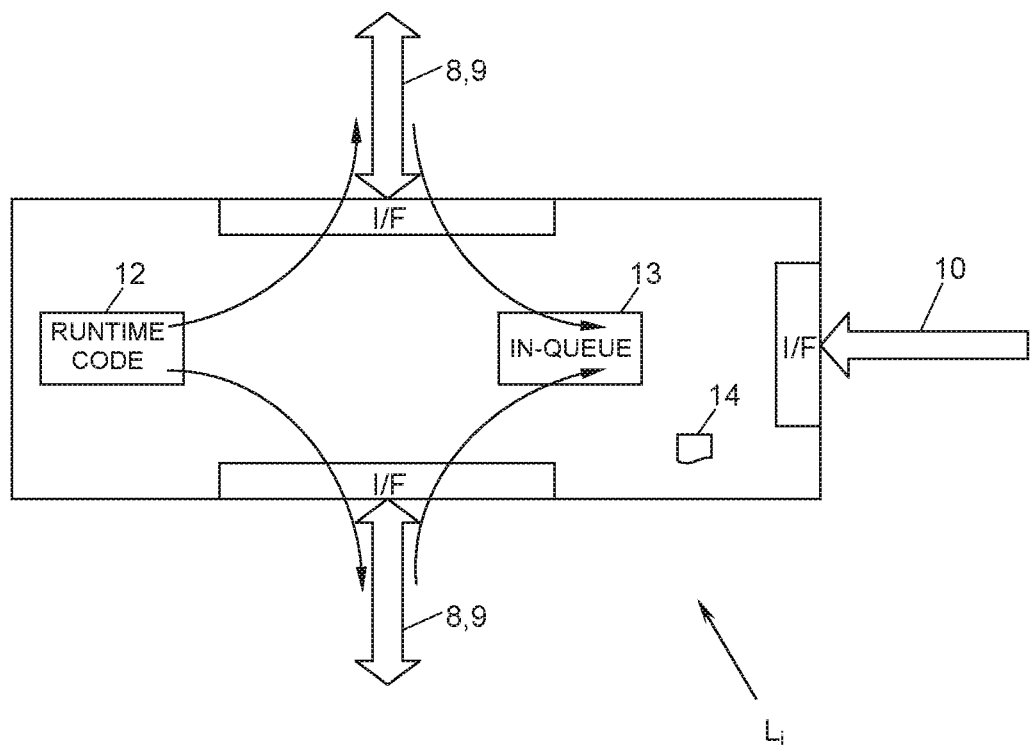
FIG. 2 shows one of the software modules of the device from FIG. 1 in detail.

FIG. 2 shows the internal structure of one of the software modules $L_i$ in detail. Each software module $L_i$ is responsible for one of the communication layers of the layered network protocol which the device 1 or the method performed thereby processes. In the case of the OSI reference model, seven software modules $L_i$ (i=1 ... 7) are provided, which each run one of the seven OSI layers. The software modules $L_i$ are for this purpose "encapsulated" or "autonomous" with respect to one another by being linked merely via the message channels 8, 9 to form a "stack"; the totality of software modules $L_i$ stacked one above the other is referred to as a protocol stack 11.

It goes without saying that in the case of other network protocols, for example the four-layered TCP/IP reference model, only four software modules $L_1$ (i=1 ... 4) are necessary, each of which is responsible for the functionality of a communication layer.

In accordance with FIG. 2, each software module $L_i$ for this purpose has a corresponding control program 12 and resources (provided by the abstraction module 7) for the running thereof, in particular an internal message queue 13, which records communication messages arriving via the communication channels 8, 9 and also control messages arriving via the message channel 10 for execution by the control program 12.

The software module $L_i$ of the protocol stack 11 that is lowest in the layer hierarchy, here the software module $L_1$ for the bit transfer layer of the OSI reference model or the network access layer of the TCP/IP reference model, is connected via its communication channels 8, 9 to the interface framework module 5, via which the physical data traffic is handled by the network 2. The physical interfaces I/F necessary for this purpose are presented from the interface framework module 5 to the protocol stack 11 or software modules $L_i$ thereof, abstracted from the hardware or software operating environment.

The source code of a software module $L_i$ can thus be used in an embedded target environment or as a kernel mode driver of a PC operating system without having to port the source code of the software module $L_i$. This has the further advantage that a source code for embedded systems can first be developed and tested under PC operating systems and only then can be compiled for an arbitrary embedded target system, without the source code having to be ported for the software modules $L_i$ ("Portability without Porting"). Due to the high degree of re-use of codes of the software modules $L_i$, a continuous improvement of the quality of the code is also attained by "Design Re-Use" optimisation. There is additionally also the further advantage that performance requirements on an embedded target system, such as processor powers and requirements on the memories, can already be estimated prior to the development of the embedded target system or the ECU. Since the interfaces and communication channels of the software modules $L_i$ are specified, these can also be re-used in distributed teams of large development organisations in a simple manner.

For the implementation of cryptographic security mechanisms in the network protocol processed by the device 1, one or more cryptographic keys 14 are used in one or more communication layers, i.e. in one or more of the software modules $L_i$, for example public or private keys of public/private key encryption methods which are exchanged by two communication partners via the network 2, or common keys of shared key encryption methods, which for example are generated by the key generation central entity 3 and are distributed via the network 2, or the like.

The software module $L_i$ responsible for the respective communication layer therefore requires the knowledge of the respective key(s) 14 which is/are necessary in the communication layer of said software module for the respective encryption or decryption.

For this purpose, the task scheduler 4 is designed to distribute such keys 14 obtained via the network 2 and the interface framework module 5 from the external network 2 to the respective software module $L_i$, more specifically via the message channel 10 thereof. These keys 14 can also be merely constituents of a larger, assembled or "complete" key, which is necessary for the encryption or decryption in the protocol layer of the software module $L_i$. In this case a plurality of keys 14 obtained in this way from the task scheduler 4 are combined to form the necessary complete key.

The keys 14 can be requested ("pull") or obtained ("push") for example from the abstraction module 7 via the interface framework module 5 by the communication partner in the network 2, for example another device 1 or the key generation central entity 3, and the task scheduler 4 is used merely for the corresponding distribution or delivery of the key(s) 14 thus obtained to the respective correct software module $L_i$ in the course of the program run 6. Alternatively, the task scheduler 4 itself requests or itself receives the key(s) 14 from the network 2 and sends this/these to the respective software module $L_i$. A further possibility is that one of the higher-ranking software modules $L_i$, in particular a software module $L_i$ of a higher application-oriented layer in the course of an application, receives one or more keys for a lower-ranking software module $L_i$ and passes this/these on to the corresponding lower-ranking software module $L_i$ via the task scheduler 4 or the abstraction module 7. Here, as well, the task scheduler 4 functions again—in the course of the execution of the control loop 6—as a deliverer of the respective key 14 to the corresponding software module $L_i$ via the message channel 10 thereof. A key 14 obtained from the task scheduler 4 can also be used in a software module $L_i$ to encrypt and decrypt the communication on the (at least one) message channel 10 thereof, for example for secure transfer of a following key 14.

The invention is not limited to the presented embodiments, but comprises all variants, combinations and modifications thereof which fall within the scope of the accompanying claims. By way of example, the message channel 10 of the above-described device can also be used to debug a software module $L_i$ or to switch this on and off—locally or via another network—wherein the information exchange via this channel 10 can also be encrypted in accordance with the above-described methods.

What is claimed is:

1. A device for secure data communication according to a network protocol that has a plurality of communication layers layered into a protocol stack, said device comprising a memory and a processor system, in which a processor, controlled by a task scheduler, executes a plurality of autonomous software modules, which each run a different one of the communication layers of the protocol stack, wherein the software modules are linked via communication channels to the protocol stack and the protocol stack is connected to an interface framework for data communication with an external network, wherein to at least one software module a cryptographic key is assigned for secure data communication in the communication layer that is run by said at least one software module, and wherein the task scheduler is configured to obtain said cryptographic key from the external network via the interface framework and to distribute said cryptographic key to said at least one software module.

2. The device according to claim 1, wherein the network protocol is constructed according to an Open Systems Interconnection (OSI) reference model and each software module runs a layer of the OSI reference model.

3. The device according to claim 1, wherein each software module has an input for at least one message channel, which is connected to the task scheduler, so as to thus obtain the key.

4. The device according to claim 3, wherein the software modules can be debugged or can be switched on and off via the at least one message channel.

5. The device according to claim 3, wherein the software modules are configured to use a further key obtained from the task scheduler for secure message traffic on the message channel.

6. The device according to claim 1, wherein the task scheduler is part of an abstraction module for the software modules which is run by the processor.

7. The device according to claim 1 wherein the device is a modem or an electronic control unit (ECU) and the processor system is a single-processor system.

8. A method for secure data communication according to a network protocol having a plurality of communication layers layered into a protocol stack, wherein, in a processor system, a processor, controlled by a task scheduler, executes a number of autonomous software modules, which each run a different one of the communication layers of the protocol stack, wherein the autonomous software modules are linked via communication channels to the protocol stack and the protocol stack is connected to an interface framework for data communication with an external network, wherein to at least one of the autonomous software modules, a cryptographic key is assigned for secure data communication in the communication layer run by said at least one of the autonomous software modules, and wherein said cryptographic key is obtained from the external network via the interface framework and is distributed by the task scheduler to said at least one of the autonomous software module.

9. The method according to claim 8, wherein the network protocol is constructed according to an Open Systems Interconnection (OSI) reference module and each software module runs a layer of the OSI reference module.

10. The method according to claim 8, wherein the aforementioned at least one of the autonomous software modules obtains the cryptographic key from the task scheduler via a separate message channel.

11. The method according to claim 10, wherein the at least one of the autonomous software modules can be debugged or switched on and off via the message channel.

12. The method according to claim 10, wherein the at least one of the autonomous software modules obtains a further key from the task scheduler and uses it for secure message traffic on the message channel.

13. The method according to claim 8, wherein the task scheduler is part of an abstraction module for the autonomous software modules which is run by the processor.

14. A computer program product, embodied on a non-transitory machine-readable data carrier, implementing a method according to claim 8.

15. A computer program product, embodied on a non-transitory machine-readable data carrier, implementing a method according to claim 9.

* * * * *